United States Patent
Kahn et al.

(10) Patent No.: US 9,529,437 B2
(45) Date of Patent: Dec. 27, 2016

(54) METHOD AND APPARATUS FOR A MOTION STATE AWARE DEVICE

(75) Inventors: Philippe Kahn, Aptos, CA (US); Arthur Kinsolving, Santa Cruz, CA (US); David Vogel, Santa Cruz, CA (US); Mark Andrew Christensen, Santa Cruz, CA (US)

(73) Assignee: DP TECHNOLOGIES, INC., Scotts Valley, CA (US)

( * ) Notice: Subject to any disclaimer, the term of this patent is extended or adjusted under 35 U.S.C. 154(b) by 464 days.

(21) Appl. No.: 12/472,361

(22) Filed: May 26, 2009

(65) Prior Publication Data

US 2010/0306711 A1 Dec. 2, 2010

(51) Int. Cl.
*G06F 3/01* (2006.01)
*H04M 1/60* (2006.01)

(52) U.S. Cl.
CPC ............ *G06F 3/017* (2013.01); *H04M 1/6058* (2013.01); *H04M 2250/12* (2013.01)

(58) Field of Classification Search
CPC .............................. G06F 3/017; H04M 1/6058
USPC .......... 715/863; 381/74; 713/320; 455/575.2
See application file for complete search history.

(56) References Cited

U.S. PATENT DOCUMENTS

| | | |
|---|---|---|
| 4,285,041 A | 8/1981 | Smith |
| 4,571,680 A | 2/1986 | Wu |
| 4,578,769 A | 3/1986 | Frederick |
| 4,700,369 A | 10/1987 | Seigal et al. |
| 4,776,323 A | 10/1988 | Spector |
| 5,313,060 A | 5/1994 | Gast et al. |
| 5,386,210 A | 1/1995 | Lee |
| 5,430,480 A | 7/1995 | Allen et al. |
| 5,446,725 A | 8/1995 | Ishiwatari |
| 5,446,775 A | 8/1995 | Wright et al. |
| 5,454,114 A | 9/1995 | Yach et al. |
| 5,485,402 A | 1/1996 | Smith et al. |
| 5,506,987 A | 4/1996 | Abramson et al. |
| 5,515,419 A | 5/1996 | Sheffer |
| 5,583,776 A | 12/1996 | Levi et al. |
| 5,593,431 A | 1/1997 | Sheldon |
| 5,654,619 A | 8/1997 | Iwashita |
| 5,703,786 A | 12/1997 | Conkright |
| 5,737,439 A | 4/1998 | Lapsley et al. |
| 5,771,001 A | 6/1998 | Cobb |
| 5,778,882 A | 7/1998 | Raymond et al. |

(Continued)

FOREIGN PATENT DOCUMENTS

| | | |
|---|---|---|
| EP | 1 104 143 | 5/2001 |
| EP | 0 833 537 | 7/2002 |

(Continued)

OTHER PUBLICATIONS

Lee, Hyunseok, et al, A Dual Processor Solution for the MAC Layer of a Software Defined Radio Terminal, Advanced Computer Architecture Laboratory, University of Michigan, 25 pages.

(Continued)

*Primary Examiner* — Andrea Long
(74) *Attorney, Agent, or Firm* — HIPLegal LLP; Judith A. Szepesi

(57) ABSTRACT

A device comprising a motion context logic that receives data from at least one motion sensor is described. The motion context logic determines a user's motion context. Context based action logic manages the device based on the user's motion context.

21 Claims, 7 Drawing Sheets

(56) References Cited

U.S. PATENT DOCUMENTS

| | | |
|---|---|---|
| 5,911,065 A | 6/1999 | Williams et al. |
| 5,955,667 A | 9/1999 | Fyfe |
| 5,955,871 A | 9/1999 | Nguyen |
| 5,960,085 A | 9/1999 | de la Huerga |
| 5,976,083 A | 11/1999 | Richardson et al. |
| 6,013,007 A | 1/2000 | Root et al. |
| 6,061,456 A * | 5/2000 | Andrea et al. ............... 381/71.6 |
| 6,122,595 A | 9/2000 | Varley et al. |
| 6,129,686 A | 10/2000 | Friedman |
| 6,135,951 A | 10/2000 | Richardson et al. |
| 6,145,389 A | 11/2000 | Ebeling et al. |
| 6,246,321 B1 | 6/2001 | Rechsteiner et al. |
| 6,282,496 B1 | 8/2001 | Chowdhary |
| 6,336,891 B1 | 1/2002 | Fedrigon et al. |
| 6,353,449 B1 | 3/2002 | Gregg et al. |
| 6,369,794 B1 | 4/2002 | Sakurai et al. |
| 6,396,883 B2 | 5/2002 | Yang et al. |
| 6,408,330 B1 | 6/2002 | de la Huerga |
| 6,428,490 B1 | 8/2002 | Kramer et al. |
| 6,470,147 B1 | 10/2002 | Imada |
| 6,478,736 B1 | 11/2002 | Mault |
| 6,493,652 B1 | 12/2002 | Ohlenbusch et al. |
| 6,496,695 B1 | 12/2002 | Kouji et al. |
| 6,513,381 B2 | 2/2003 | Fyfe et al. |
| 6,522,266 B1 | 2/2003 | Soehren et al. |
| 6,529,144 B1 | 3/2003 | Nilsen |
| 6,532,419 B1 | 3/2003 | Begin et al. |
| 6,539,336 B1 | 3/2003 | Vock et al. |
| 6,595,929 B2 | 7/2003 | Stivoric et al. |
| 6,601,016 B1 | 7/2003 | Brown et al. |
| 6,607,493 B2 | 8/2003 | Song |
| 6,611,789 B1 | 8/2003 | Darley |
| 6,628,898 B2 | 9/2003 | Endo |
| 6,634,992 B1 | 10/2003 | Ogawa |
| 6,665,802 B1 | 12/2003 | Ober |
| 6,672,991 B2 | 1/2004 | O'Malley |
| 6,685,480 B2 | 2/2004 | Nishimoto et al. |
| 6,700,499 B2 | 3/2004 | Kubo et al. |
| 6,731,958 B1 | 5/2004 | Shirai |
| 6,766,176 B1 | 7/2004 | Gupta et al. |
| 6,771,250 B1 | 8/2004 | Oh |
| 6,786,877 B2 | 9/2004 | Foxlin |
| 6,788,980 B1 | 9/2004 | Johnson |
| 6,790,178 B1 | 9/2004 | Mault et al. |
| 6,807,564 B1 | 10/2004 | Zellner et al. |
| 6,813,582 B2 | 11/2004 | Levi et al. |
| 6,823,036 B1 | 11/2004 | Chen |
| 6,826,477 B2 | 11/2004 | Ladetto et al. |
| 6,836,744 B1 | 12/2004 | Asphahani et al. |
| 6,881,191 B2 | 4/2005 | Oakley et al. |
| 6,885,971 B2 | 4/2005 | Vock et al. |
| 6,895,425 B1 | 5/2005 | Kadyk et al. |
| 6,898,550 B1 | 5/2005 | Blackadar et al. |
| 6,928,382 B2 | 8/2005 | Hong et al. |
| 6,941,239 B2 | 9/2005 | Unuma et al. |
| 6,959,259 B2 | 10/2005 | Vock et al. |
| 6,975,959 B2 | 12/2005 | Dietrich et al. |
| 6,997,852 B2 | 2/2006 | Watterson et al. |
| 7,002,553 B2 | 2/2006 | Shkolnikov |
| 7,010,332 B1 | 3/2006 | Irvin et al. |
| 7,020,487 B2 | 3/2006 | Kimata |
| 7,027,087 B2 | 4/2006 | Nozaki et al. |
| 7,028,547 B2 | 4/2006 | Shiratori et al. |
| 7,042,509 B2 | 5/2006 | Onuki |
| 7,054,784 B2 | 5/2006 | Flentov et al. |
| 7,057,551 B1 | 6/2006 | Vogt |
| 7,072,789 B2 | 7/2006 | Vock et al. |
| 7,092,846 B2 | 8/2006 | Vock et al. |
| 7,096,619 B2 | 8/2006 | Jackson et al. |
| 7,148,797 B2 | 12/2006 | Albert |
| 7,148,879 B2 | 12/2006 | Amento et al. |
| 7,149,964 B1 | 12/2006 | Cottrille et al. |
| 7,155,507 B2 | 12/2006 | Hirano et al. |
| 7,158,912 B2 | 1/2007 | Vock et al. |
| 7,169,084 B2 | 1/2007 | Tsuji |
| 7,171,222 B2 | 1/2007 | Fotstick |
| 7,171,331 B2 | 1/2007 | Vock et al. |
| 7,173,604 B2 | 2/2007 | Marvit |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,177,684 B1 | 2/2007 | Kroll et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,200,517 B2 | 4/2007 | Darley et al. |
| 7,212,230 B2 | 5/2007 | Stavely |
| 7,212,943 B2 | 5/2007 | Aoshima et al. |
| 7,220,220 B2 | 5/2007 | Stubbs et al. |
| 7,245,725 B1 * | 7/2007 | Beard ........................... 380/270 |
| 7,254,516 B2 | 8/2007 | Case et al. |
| 7,280,096 B2 | 10/2007 | Marvit et al. |
| 7,280,849 B1 | 10/2007 | Bailey |
| 7,297,088 B2 | 11/2007 | Tsuji |
| 7,301,526 B2 | 11/2007 | Marvit et al. |
| 7,301,527 B2 | 11/2007 | Marvit et al. |
| 7,301,528 B2 | 11/2007 | Marvit et al. |
| 7,301,529 B2 | 11/2007 | Marvit et al. |
| 7,305,323 B2 | 12/2007 | Skvortsov et al. |
| 7,334,472 B2 | 2/2008 | Seo et al. |
| 7,353,112 B2 | 4/2008 | Choi et al. |
| 7,365,735 B2 | 4/2008 | Reinhardt et al. |
| 7,365,736 B2 | 4/2008 | Marvit et al. |
| 7,365,737 B2 | 4/2008 | Marvit et al. |
| 7,379,999 B1 | 5/2008 | Zhou et al. |
| 7,382,611 B2 | 6/2008 | Tracy et al. |
| 7,387,611 B2 | 6/2008 | Inoue et al. |
| 7,397,357 B2 | 7/2008 | Krumm et al. |
| 7,451,056 B2 | 11/2008 | Flentov et al. |
| 7,457,719 B1 | 11/2008 | Kahn et al. |
| 7,457,872 B2 | 11/2008 | Aton et al. |
| 7,463,997 B2 | 12/2008 | Pasolini et al. |
| 7,467,060 B2 | 12/2008 | Kulach et al. |
| 7,489,937 B2 | 2/2009 | Chung et al. |
| 7,502,643 B2 | 3/2009 | Farringdon et al. |
| 7,512,515 B2 | 3/2009 | Vock et al. |
| 7,526,402 B2 | 4/2009 | Tenanhaus et al. |
| 7,608,050 B2 | 10/2009 | Sugg |
| 7,640,804 B2 | 1/2010 | Daumer et al. |
| 7,647,196 B2 | 1/2010 | Kahn et al. |
| 7,653,508 B1 | 1/2010 | Kahn et al. |
| 7,664,657 B1 | 2/2010 | Letzt et al. |
| 7,689,107 B2 | 3/2010 | Enomoto |
| 7,705,884 B2 | 4/2010 | Pinto et al. |
| 7,736,272 B2 | 6/2010 | Martens |
| 7,752,011 B2 | 7/2010 | Niva et al. |
| 7,753,861 B1 | 7/2010 | Kahn et al. |
| 7,765,553 B2 | 7/2010 | Douceur et al. |
| 7,774,156 B2 | 8/2010 | Niva et al. |
| 7,788,059 B1 | 8/2010 | Kahn et al. |
| 7,840,346 B2 | 11/2010 | Huhtala et al. |
| 7,857,772 B2 | 12/2010 | Bouvier et al. |
| 7,881,902 B1 | 2/2011 | Kahn et al. |
| 7,892,080 B1 | 2/2011 | Dahl |
| 7,907,901 B1 | 3/2011 | Kahn et al. |
| 7,987,070 B2 | 7/2011 | Kahn et al. |
| 8,187,182 B2 | 5/2012 | Kahn et al. |
| 8,275,635 B2 | 9/2012 | Stivoric et al. |
| 8,398,546 B2 | 3/2013 | Pacione et al. |
| 8,458,715 B1 | 6/2013 | Khosla et al. |
| 8,562,489 B2 | 10/2013 | Burton et al. |
| 8,790,279 B2 | 7/2014 | Brunner |
| 2001/0047488 A1 | 11/2001 | Verplaetse et al. |
| 2002/0006284 A1 | 1/2002 | Kim |
| 2002/0022551 A1 | 2/2002 | Watterson et al. |
| 2002/0023654 A1 | 2/2002 | Webb |
| 2002/0027164 A1 | 3/2002 | Mault et al. |
| 2002/0042830 A1 | 4/2002 | Bose et al. |
| 2002/0044634 A1 | 4/2002 | Rooke et al. |
| 2002/0054214 A1 | 5/2002 | Yoshikawa |
| 2002/0089425 A1 | 7/2002 | Kubo et al. |
| 2002/0109600 A1 | 8/2002 | Mault et al. |
| 2002/0118121 A1 | 8/2002 | Lehrman et al. |
| 2002/0122543 A1 | 9/2002 | Rowen |

(56) References Cited

U.S. PATENT DOCUMENTS

| | | |
|---|---|---|
| 2002/0138017 A1 | 9/2002 | Bui et al. |
| 2002/0142887 A1 | 10/2002 | O'Malley |
| 2002/0150302 A1 | 10/2002 | McCarthy et al. |
| 2002/0151810 A1 | 10/2002 | Wong et al. |
| 2002/0173295 A1 | 11/2002 | Nykanen et al. |
| 2002/0190947 A1 | 12/2002 | Feinstein |
| 2002/0193124 A1 | 12/2002 | Hamilton et al. |
| 2003/0018430 A1 | 1/2003 | Ladetto et al. |
| 2003/0033411 A1 | 2/2003 | Kavoori et al. |
| 2003/0048218 A1 | 3/2003 | Milnes et al. |
| 2003/0083596 A1 | 5/2003 | Kramer et al. |
| 2003/0093187 A1 | 5/2003 | Walker et al. |
| 2003/0101260 A1 | 5/2003 | Dacier et al. |
| 2003/0109258 A1 | 6/2003 | Mantyjarvi et al. |
| 2003/0139692 A1 | 7/2003 | Barrey et al. |
| 2003/0139908 A1 | 7/2003 | Wegerich et al. |
| 2003/0149526 A1 | 8/2003 | Zhou et al. |
| 2003/0151672 A1 | 8/2003 | Robins et al. |
| 2003/0187683 A1 | 10/2003 | Kirchhoff et al. |
| 2003/0208110 A1 | 11/2003 | Mault et al. |
| 2003/0208113 A1 | 11/2003 | Mault et al. |
| 2003/0227487 A1 | 12/2003 | Hugh |
| 2003/0236625 A1 | 12/2003 | Brown et al. |
| 2004/0017300 A1 | 1/2004 | Kotzin et al. |
| 2004/0024846 A1 | 2/2004 | Randall et al. |
| 2004/0043760 A1 | 3/2004 | Rosenfeld et al. |
| 2004/0044493 A1 | 3/2004 | Coulthard |
| 2004/0047498 A1 | 3/2004 | Mulet-Parada et al. |
| 2004/0078219 A1 | 4/2004 | Kaylor et al. |
| 2004/0078220 A1 | 4/2004 | Jackson |
| 2004/0081441 A1 | 4/2004 | Sato et al. |
| 2004/0106421 A1 | 6/2004 | Tomiyoshi et al. |
| 2004/0106958 A1 | 6/2004 | Mathis et al. |
| 2004/0122294 A1 | 6/2004 | Hatlestad et al. |
| 2004/0122295 A1 | 6/2004 | Hatlestad et al. |
| 2004/0122296 A1 | 6/2004 | Hatlestad et al. |
| 2004/0122297 A1 | 6/2004 | Stahmann et al. |
| 2004/0122333 A1 | 6/2004 | Nissila |
| 2004/0122484 A1 | 6/2004 | Hatlestad et al. |
| 2004/0122485 A1 | 6/2004 | Stahmann et al. |
| 2004/0122486 A1 | 6/2004 | Stahmann et al. |
| 2004/0122487 A1 | 6/2004 | Hatlestad et al. |
| 2004/0125073 A1 | 7/2004 | Potter et al. |
| 2004/0130628 A1 | 7/2004 | Stavely |
| 2004/0135898 A1 | 7/2004 | Zador |
| 2004/0146048 A1 | 7/2004 | Cotte |
| 2004/0148340 A1 | 7/2004 | Cotte |
| 2004/0148341 A1 | 7/2004 | Cotte |
| 2004/0148342 A1 | 7/2004 | Cotte |
| 2004/0148351 A1 | 7/2004 | Cotte |
| 2004/0176067 A1 | 9/2004 | Lakhani et al. |
| 2004/0185821 A1* | 9/2004 | Yuasa ................ 455/343.5 |
| 2004/0219910 A1 | 11/2004 | Beckers |
| 2004/0225467 A1 | 11/2004 | Vock et al. |
| 2004/0236500 A1 | 11/2004 | Choi et al. |
| 2004/0242202 A1 | 12/2004 | Torvinen |
| 2004/0247030 A1 | 12/2004 | Wiethoff |
| 2004/0259494 A1 | 12/2004 | Mazar |
| 2005/0015768 A1 | 1/2005 | Moore |
| 2005/0027567 A1 | 2/2005 | Taha |
| 2005/0033200 A1 | 2/2005 | Soehren et al. |
| 2005/0038691 A1 | 2/2005 | Babu |
| 2005/0048945 A1 | 3/2005 | Porter |
| 2005/0048955 A1 | 3/2005 | Ring |
| 2005/0078197 A1 | 4/2005 | Gonzalez |
| 2005/0079873 A1 | 4/2005 | Caspi et al. |
| 2005/0101841 A9 | 5/2005 | Kaylor et al. |
| 2005/0102167 A1 | 5/2005 | Kapoor |
| 2005/0107944 A1 | 5/2005 | Hovestadt et al. |
| 2005/0113649 A1 | 5/2005 | Bergantino |
| 2005/0113650 A1 | 5/2005 | Pacione et al. |
| 2005/0125797 A1 | 6/2005 | Gabrani et al. |
| 2005/0131736 A1 | 6/2005 | Nelson et al. |
| 2005/0141522 A1 | 6/2005 | Kadar et al. |
| 2005/0143106 A1 | 6/2005 | Chan et al. |
| 2005/0146431 A1 | 7/2005 | Hastings et al. |
| 2005/0157181 A1 | 7/2005 | Kawahara et al. |
| 2005/0165719 A1 | 7/2005 | Greenspan et al. |
| 2005/0168587 A1 | 8/2005 | Sato et al. |
| 2005/0182824 A1 | 8/2005 | Cotte |
| 2005/0183086 A1 | 8/2005 | Abe et al. |
| 2005/0202934 A1 | 9/2005 | Olrik et al. |
| 2005/0203430 A1 | 9/2005 | Williams et al. |
| 2005/0210300 A1* | 9/2005 | Song et al. ................ 713/300 |
| 2005/0210419 A1 | 9/2005 | Kela |
| 2005/0212751 A1 | 9/2005 | Marvit et al. |
| 2005/0212752 A1 | 9/2005 | Marvit et al. |
| 2005/0212753 A1 | 9/2005 | Marvit et al. |
| 2005/0212760 A1 | 9/2005 | Marvit et al. |
| 2005/0216403 A1 | 9/2005 | Tam et al. |
| 2005/0222801 A1 | 10/2005 | Wulff et al. |
| 2005/0232388 A1 | 10/2005 | Tsuji |
| 2005/0232404 A1 | 10/2005 | Gaskill |
| 2005/0232405 A1* | 10/2005 | Gaskill ................ 379/201.06 |
| 2005/0234676 A1 | 10/2005 | Shibayama |
| 2005/0235058 A1 | 10/2005 | Rackus et al. |
| 2005/0238132 A1 | 10/2005 | Tsuji |
| 2005/0240375 A1 | 10/2005 | Sugai |
| 2005/0243178 A1 | 11/2005 | McConica |
| 2005/0245988 A1 | 11/2005 | Miesel |
| 2005/0248718 A1 | 11/2005 | Howell et al. |
| 2005/0256414 A1 | 11/2005 | Kettunen et al. |
| 2005/0258938 A1 | 11/2005 | Moulson |
| 2005/0262237 A1 | 11/2005 | Fulton et al. |
| 2005/0281289 A1 | 12/2005 | Huang et al. |
| 2006/0009243 A1 | 1/2006 | Dahan et al. |
| 2006/0017692 A1 | 1/2006 | Wehrenberg et al. |
| 2006/0020177 A1 | 1/2006 | Seo et al. |
| 2006/0029284 A1 | 2/2006 | Stewart |
| 2006/0040793 A1 | 2/2006 | Martens |
| 2006/0063980 A1 | 3/2006 | Hwang et al. |
| 2006/0064276 A1 | 3/2006 | Ren et al. |
| 2006/0080551 A1 | 4/2006 | Mantyjarvi et al. |
| 2006/0090088 A1* | 4/2006 | Choi et al. ................ 713/300 |
| 2006/0090161 A1* | 4/2006 | Bodas et al. ................ 718/100 |
| 2006/0098097 A1 | 5/2006 | Wach et al. |
| 2006/0100546 A1 | 5/2006 | Silk |
| 2006/0109113 A1 | 5/2006 | Reyes et al. |
| 2006/0136173 A1 | 6/2006 | Case, Jr. et al. |
| 2006/0140422 A1 | 6/2006 | Zurek et al. |
| 2006/0149516 A1 | 7/2006 | Bond et al. |
| 2006/0154642 A1 | 7/2006 | Scannell, Jr. |
| 2006/0161377 A1 | 7/2006 | Rakkola et al. |
| 2006/0161459 A9 | 7/2006 | Rosenfeld et al. |
| 2006/0167387 A1 | 7/2006 | Buchholz et al. |
| 2006/0167647 A1 | 7/2006 | Krumm et al. |
| 2006/0167943 A1 | 7/2006 | Rosenberg |
| 2006/0172706 A1 | 8/2006 | Griffin et al. |
| 2006/0174685 A1 | 8/2006 | Skvortsov et al. |
| 2006/0201964 A1 | 9/2006 | DiPerna et al. |
| 2006/0204214 A1 | 9/2006 | Shah et al. |
| 2006/0205406 A1 | 9/2006 | Pekonen et al. |
| 2006/0206258 A1 | 9/2006 | Brooks |
| 2006/0223547 A1 | 10/2006 | Chin et al. |
| 2006/0249683 A1 | 11/2006 | Goldberg et al. |
| 2006/0256082 A1 | 11/2006 | Cho et al. |
| 2006/0257042 A1 | 11/2006 | Ofek et al. |
| 2006/0259268 A1 | 11/2006 | Vock et al. |
| 2006/0284979 A1 | 12/2006 | Clarkson |
| 2006/0288781 A1 | 12/2006 | Daumer et al. |
| 2006/0289819 A1 | 12/2006 | Parsons et al. |
| 2007/0004451 A1 | 1/2007 | Anderson |
| 2007/0005988 A1 | 1/2007 | Zhang et al. |
| 2007/0017136 A1 | 1/2007 | Mosher et al. |
| 2007/0024441 A1 | 2/2007 | Kahn et al. |
| 2007/0037605 A1* | 2/2007 | Logan ................ 455/567 |
| 2007/0037610 A1 | 2/2007 | Logan |
| 2007/0038364 A1 | 2/2007 | Lee et al. |
| 2007/0040892 A1 | 2/2007 | Aoki et al. |
| 2007/0050157 A1 | 3/2007 | Kahn et al. |
| 2007/0060446 A1 | 3/2007 | Asukai et al. |
| 2007/0061105 A1 | 3/2007 | Darley et al. |
| 2007/0063850 A1 | 3/2007 | Devaul et al. |
| 2007/0067094 A1 | 3/2007 | Park et al. |

(56) References Cited

U.S. PATENT DOCUMENTS

| | | |
|---|---|---|
| 2007/0072581 A1 | 3/2007 | Arrebotu |
| 2007/0073482 A1 | 3/2007 | Churchill et al. |
| 2007/0075127 A1 | 4/2007 | Rosenberg |
| 2007/0075965 A1 | 4/2007 | Huppi et al. |
| 2007/0078324 A1 | 4/2007 | Wijisiriwardana |
| 2007/0082789 A1 | 4/2007 | Nissila et al. |
| 2007/0102525 A1 | 5/2007 | Orr et al. |
| 2007/0104479 A1 | 5/2007 | Machida |
| 2007/0106991 A1 | 5/2007 | Yoo |
| 2007/0125852 A1 | 6/2007 | Rosenberg |
| 2007/0130582 A1 | 6/2007 | Chang et al. |
| 2007/0142715 A1 | 6/2007 | Banet et al. |
| 2007/0143068 A1 | 6/2007 | Pasolini et al. |
| 2007/0145680 A1 | 6/2007 | Rosenberg |
| 2007/0150136 A1 | 6/2007 | Doll et al. |
| 2007/0156364 A1 | 7/2007 | Rothkopf |
| 2007/0161410 A1 | 7/2007 | Huang et al. |
| 2007/0165790 A1 | 7/2007 | Taori |
| 2007/0169126 A1 | 7/2007 | Todoroki et al. |
| 2007/0176898 A1 | 8/2007 | Suh |
| 2007/0192483 A1 | 8/2007 | Rezvani et al. |
| 2007/0195784 A1 | 8/2007 | Allen et al. |
| 2007/0204744 A1 | 9/2007 | Sako et al. |
| 2007/0208531 A1 | 9/2007 | Darley et al. |
| 2007/0208544 A1 | 9/2007 | Kulach et al. |
| 2007/0213085 A1 | 9/2007 | Fedora |
| 2007/0213126 A1 | 9/2007 | Deutsch et al. |
| 2007/0221045 A1 | 9/2007 | Terauchi et al. |
| 2007/0225935 A1 | 9/2007 | Ronkainen et al. |
| 2007/0233788 A1 | 10/2007 | Bender |
| 2007/0239399 A1 | 10/2007 | Shyenblat et al. |
| 2007/0250261 A1 | 10/2007 | Soehren |
| 2007/0259685 A1 | 11/2007 | Engblom et al. |
| 2007/0259716 A1 | 11/2007 | Mattice et al. |
| 2007/0259717 A1 | 11/2007 | Mattice et al. |
| 2007/0260418 A1 | 11/2007 | Ladetto et al. |
| 2007/0260482 A1 | 11/2007 | Nurmela et al. |
| 2007/0263995 A1 | 11/2007 | Park et al. |
| 2007/0281762 A1 | 12/2007 | Barros et al. |
| 2007/0296696 A1 | 12/2007 | Nurmi |
| 2008/0005738 A1 | 1/2008 | Imai et al. |
| 2008/0030586 A1 | 2/2008 | Helbing et al. |
| 2008/0046888 A1 | 2/2008 | Appaji |
| 2008/0052716 A1 | 2/2008 | Theurer |
| 2008/0072014 A1 | 3/2008 | Krishnan et al. |
| 2008/0102785 A1 | 5/2008 | Childress et al. |
| 2008/0109158 A1 | 5/2008 | Huhtala et al. |
| 2008/0113689 A1* | 5/2008 | Bailey ................. 455/569.1 |
| 2008/0114538 A1 | 5/2008 | Lindroos |
| 2008/0140338 A1 | 6/2008 | No et al. |
| 2008/0153671 A1 | 6/2008 | Ogg et al. |
| 2008/0161072 A1 | 7/2008 | Lide et al. |
| 2008/0165022 A1 | 7/2008 | Herz et al. |
| 2008/0168361 A1 | 7/2008 | Forstall et al. |
| 2008/0171918 A1 | 7/2008 | Teller et al. |
| 2008/0214358 A1 | 9/2008 | Ogg et al. |
| 2008/0231713 A1 | 9/2008 | Florea et al. |
| 2008/0231714 A1 | 9/2008 | Estevez et al. |
| 2008/0232604 A1 | 9/2008 | Dufresne et al. |
| 2008/0243432 A1 | 10/2008 | Kato et al. |
| 2008/0303681 A1 | 12/2008 | Herz et al. |
| 2008/0311929 A1 | 12/2008 | Carro et al. |
| 2009/0017880 A1 | 1/2009 | Moore et al. |
| 2009/0024233 A1 | 1/2009 | Shirai et al. |
| 2009/0031319 A1 | 1/2009 | Fecioru |
| 2009/0043531 A1 | 2/2009 | Kahn et al. |
| 2009/0047645 A1 | 2/2009 | Dibenedetto et al. |
| 2009/0067826 A1 | 3/2009 | Shinohara et al. |
| 2009/0082994 A1 | 3/2009 | Schuler |
| 2009/0088204 A1 | 4/2009 | Culbert et al. |
| 2009/0098880 A1 | 4/2009 | Lindquist |
| 2009/0099668 A1 | 4/2009 | Lehman et al. |
| 2009/0124348 A1 | 5/2009 | Yoseloff et al. |
| 2009/0124938 A1 | 5/2009 | Brunner |
| 2009/0128448 A1* | 5/2009 | Riechel ............................ 345/8 |
| 2009/0174782 A1 | 7/2009 | Kahn et al. |
| 2009/0213002 A1 | 8/2009 | Rani et al. |
| 2009/0215502 A1* | 8/2009 | Griffin, Jr. ................. 455/569.1 |
| 2009/0234614 A1 | 9/2009 | Kahn et al. |
| 2009/0274317 A1* | 11/2009 | Kahn et al. ..................... 381/74 |
| 2009/0296951 A1* | 12/2009 | De Haan ........................ 381/74 |
| 2009/0319221 A1 | 12/2009 | Kahn et al. |
| 2009/0325705 A1* | 12/2009 | Filer et al. ..................... 463/39 |
| 2010/0056872 A1 | 3/2010 | Kahn et al. |
| 2010/0057398 A1 | 3/2010 | Darley et al. |
| 2010/0199189 A1 | 8/2010 | Ben-Aroya et al. |
| 2010/0245131 A1* | 9/2010 | Graumann ...................... 341/20 |
| 2010/0277489 A1* | 11/2010 | Geisner et al. ............... 345/581 |
| 2010/0283742 A1* | 11/2010 | Lam ............................. 345/173 |
| 2011/0003665 A1 | 1/2011 | Burton et al. |

FOREIGN PATENT DOCUMENTS

| | | |
|---|---|---|
| GB | 2431813 A | 5/2007 |
| JP | 7020547 A | 1/1995 |
| JP | 2001-057695 | 2/2001 |
| JP | 2003-143683 | 5/2003 |
| JP | 2005-309691 | 11/2005 |
| JP | 2006-118909 | 5/2006 |
| JP | 2006-239398 | 9/2006 |
| JP | 2007-104670 | 4/2007 |
| JP | 2007-215784 | 8/2007 |
| JP | 2007-226855 | 9/2007 |
| WO | WO 99/22338 | 5/1999 |
| WO | WO 00/63874 | 10/2000 |
| WO | WO 02/088926 | 11/2002 |

OTHER PUBLICATIONS

"Decrease Processor Power Consumption using a CoolRunner CPLD," XILINX XAPP347 (v1.0), May 16, 2001, 9 pages.

PCT/US10/36091, International Preliminary Report on Patentability, Mailed Jul. 27, 2011, 8 pages.

PCT/US10/36091, The International Search Report and Written Opinion, Date of mailing: Jul. 28, 2010, 7 pages.

"Access and Terminals (AT); Multimedia Message Service (MMS) for PSTN/ISDN; Multimedia Message Communication Between a Fixed Network Multimedia Message Terminal Equipment and a Multimedia Message Service Centre," ETSI AT-F Rapporteur Meeting, Feb. 4-6, 2003, Gothenburg, DES/AT-030023 V0.0.1 (Mar. 2003).

Anderson, Ian, et al, "Shakra: Tracking and Sharing Daily Activity Levels with Unaugmented Mobile Phones," Mobile Netw Appl, Aug. 3, 2007, pp. 185-199.

Ang, Wei Tech, et al, "Zero Phase Filtering for Active Compensation of Periodic Physiological Motion," Proc 1st IEEE / RAS-EMBS International Conference on Biomedical Robotics and Biomechatronics, Feb. 20-22, 2006, pp. 182-187.

Aylward, Ryan, et al, "Sensemble: A Wireless, Compact, Multi-User Sensor System for Interactive Dance," International Conference on New Interfaces for Musical Expression (NIME06), Jun. 4-8, 2006, pp. 134-139.

Baca, Arnold, et al, "Rapid Feedback Systems for Elite Sports Training," IEEE Pervasive Computing, Oct.-Dec. 2006, pp. 70-76.

Bakhru, Kesh, "A Seamless Tracking Solution for Indoor and Outdoor Position Location," IEEE 16th International Symposium on Personal, Indoor, and Mobile Radio Communications, 2005, pp. 2029-2033.

Bliley, Kara E, et al, "A Miniaturized Low Power Personal Motion Analysis Logger Utilizing Mems Accelerometers and Low Power Microcontroller," IEEE EMBS Special Topic Conference on Microtechnologies in Medicine and Biology, May 12-15, 2005, pp. 92-93.

Bourzac, Katherine "Wearable Health Reports," Technology Review, Feb. 28, 2006, <http://www.techreview.com/printer_friendly_article_aspx?id+16431>, Mar. 22, 2007, 3 pages.

Cheng, et al, "Periodic Human Motion Description for Sports Video Databases," Proceedings of the Pattern Recognition, 2004, 5 pages.

(56) References Cited

OTHER PUBLICATIONS

Dao, Ricardo, "Inclination Sensing with Thermal Accelerometers", MEMSIC, May 2002, 3 pages.
Fang, Lei, et al, "Design of a Wireless Assisted Pedestrian Dead Reckoning System—The NavMote Experience," IEEE Transactions on Instrumentation and Measurement, vol. 54, No. 6, Dec. 2005, pp. 2342-2358.
Healey, Jennifer, et al, "Wearable Wellness Monitoring Using ECG and Accelerometer Data," IEEE Int. Symposium on Wearable Computers (ISWC'05), 2005, 2 pages.
Hemmes, Jeffrey, et al, "Lessons Learned Building TeamTrak: An Urban/Outdoor Mobile Testbed," 2007 IEEE Int. Conf. on Wireless Algorithms, Aug. 1-3, 2007, pp. 219-224.
Jones, L, et al, "Wireless Physiological Sensor System for Ambulatory Use," <http://ieeexplorejeee.org/xpl/freeabs_all.jsp?tp=&arnumber=1612917&isnumber=33861>, Apr. 3-5, 2006.
Jovanov, Emil, et al, "A Wireless Body Area Network of Intelligent Motion Sensors for Computer Assisted Physical Rehabilitation," Journal of NeuroEngineering and Rehabilitation, Mar. 2005, 10 pages.
Kalpaxis, Alex, "Wireless Temporal-Spatial Human Mobility Analysis Using Real-Time Three Dimensional Acceleration Data," IEEE Intl. Multi-Conf. on Computing in Global IT (ICCGI'07), 2007, 7 pages.
Lee, Seon-Woo, et al., "Recognition of Walking Behaviors for Pedestrian Navigation," ATR Media Integration & Communications Research Laboratories, Kyoto, Japan, pp. 1152-1155.
Margaria, Rodolfo, "Biomechanics and Energetics of Muscular Exercise", Chapter 3, pp. 105-125, Oxford: Clarendon Press 1976.
Milenkovic, Milena, et al, "An Accelerometer-Based Physical Rehabilitation System," IEEE SouthEastern Symposium on System Theory, 2002, pp. 57-60.
Mizell, David, "Using Gravity to Estimate Accelerometer Orientation", Seventh IEEE International Symposium on Wearable Computers, 2003, 2 pages.
Ormoneit, D, et al, Learning and Tracking of Cyclic Human Motion: Proceedings of NIPS 2000, Neural Information Processing Systems, 2000, Denver, CO, pp. 894-900.
Otto, Chris, et al, "System Architecture of a Wireless Body Area Sensor Network for Ubiquitous Health Monitoring," Journal of Mobile Multimedia, vol. 1, No. 4, 2006, pp. 307-326.
Park, Chulsung, et al, "Eco: An Ultra-Compact Low-Power Wireless Sensor Node for Real-Time Motion Monitoring," IEEE Int. Symp. On Information Processing in Sensor Networks, 2005, pp. 398-403.
Ricoh, "Advanced digital technology changes creativity," <http://www.ricoh.com/r_dc/gx/gx200/features2.html>, Accessed May 12, 2011, 4 pages.
"Sensor Fusion," <www.u-dynamics.com>, accessed Aug. 29, 2008, 2 pages.
Shen, Chien-Lung, et al, "Wearable Band Using a Fabric-Based Sensor for Exercise ECG Monitoring," IEEE Int. Symp. on Wearable Computers, 2006, 2 pages.
Tapia, Emmanuel Munguia, et al, "Real-Time Recognition of Physical Activities and Their Intensities Using Wireless Accelerometers and a Heart Rate Monitor," IEEE Cont. on Wearable Computers, Oct. 2007, 4 pages.
Tech, Ang Wei, "Real-time Image Stabilizer," <http://www.mae.ntu.edu.sg/ABOUTMAE/DIVISIONS/RRC_BIOROBOTICS/Pages/rtimage.aspx>, Mar. 23, 2009, 3 pages.
Wang, Shu, et al, "Location Based Services for Mobiles: Technologies and Standards, LG Electronics MobileComm," IEEE ICC 2008, Beijing, pp. 1-66 (part 1 of 3).
Wang, Shu, et al, "Location Based Services for Mobiles: Technologies and Standards, LG Electronics MobileComm," IEEE ICC 2008, Beijing, pp. 67-92 (part 2 of 3).
Wang, Shu, et al, "Location Based Services for Mobiles: Technologies and Standards, LG Electronics MobileComm," IEEE ICC 2008, Beijing, pp. 93-123 (part 3 of 3).
Weckesser, P, et al, "Multiple Sensorprocessing for High-Precision Navigation and Environmental Modeling with a Mobile Robot," IEEE, 1995, pp. 453-458.
Weinberg, Harvey, "Minimizing Power Consumption of iMEMS® Accelerometers," Analog Devices, <http://www.analog.com/static/imported-files/application_notes/5935151853362884599AN601.pdf>, 2002, 5 pages.
Weinberg, Harvey, "MEMS Motion Sensors Boost Handset Reliability" Jun. 2006, <http://www.mwrf.com/Articles/Print.cfm?ArticleID=12740>, Feb. 21, 2007, 3 pages.
Wixted, Andrew J, et al, "Measurement of Energy Expenditure in Elite Athletes Using MEMS-Based Triaxial Accelerometers," IEEE Sensors Journal, vol. 7, No. 4, Apr. 2007, pp. 481-488.
Wu, Winston H, et al, "Context-Aware Sensing of Physiological Signals," IEEE Int. Conf. on Engineering for Medicine and Biology, Aug. 23-26, 2007, pp. 5271-5275.
Yoo, Chang-Sun, et al, "Low Cost GPS/INS Sensor Fusion System for UAV Navigation," IEEE, 2003, 9 pages.
Zypad WL 1100 Wearable Computer, http://www.eurotech.fi/products/manuals/Zypad%20WL%201100_sf.pdf, Jan. 16, 2008, 2 pgs.
EP 10781099.6, Supplementary European Search Report, Dated Nov. 2, 2012, 5 pages.

\* cited by examiner

METHOD AND APPARATUS FOR A MOTION STATE AWARE DEVICE

FIELD OF THE INVENTION

The present invention relates to a headset or other user carried device, and more particularly to a motion state aware headset or device.

BACKGROUND

A headset is a headphone combined with a microphone. Headsets provide the equivalent functionality of a telephone handset with hands-free operation. Headsets can be wired or wireless. Wireless headsets generally connect to a phone via a Bluetooth or equivalent network connection.

SUMMARY

A device comprising a motion context logic that receives data from at least one motion sensor is described. The motion context logic determines a user's motion context. Context based action logic manages the device based on the user's motion context.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is for a motion context aware headset or user carried device. Although the term headset is used in the description, one of skill in the art would understand that the description below also applies to mobile phones, eye glasses, or other user carried devices which may include a motion sensing mechanism, and can be adjusted in their actions and responses based on the user's motion state. The device, in one embodiment, is designed to be coupled to a cellular phone or other telephone. In another embodiment, the device may be a self-contained cellular unit which directly interacts with the cellular network.

The headset includes at least one motion sensor. The headset may also receive data from other sensors. In one embodiment, these sensors may be in the headset, or may be external. For example, sensors may include a global positioning system (GPS) sensor, one or more motion sensors in the phone/handset, a barometric sensor, capacitance (touch) sensor(s), proximity sensors, or other sensors which may provide motion context.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
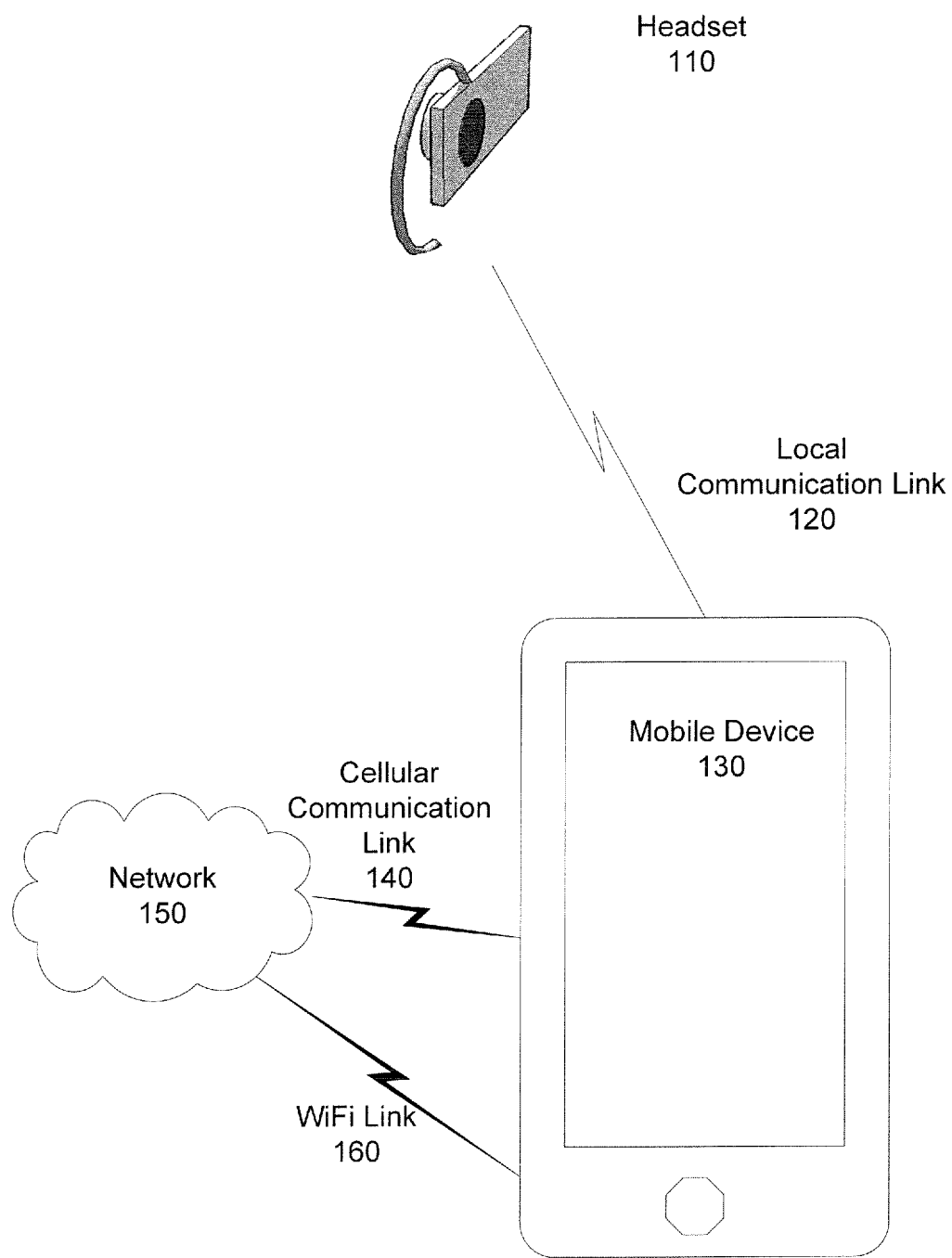
FIG. 1 is an illustration of an exemplary headset, a telephone, and their connectivity.

FIG. 1 is an illustration of an exemplary headset, a telephone, and their connectivity. Headset 110 is coupled to a mobile device 130, in one embodiment, via local communication link 120. In one embodiment, headset 110 is paired with mobile device. In one embodiment, local communication link 120 is a Personal Area Network (PAN) link. In one embodiment, the link is a Bluetooth link. Mobile device 130 can connect to a network 150 through cellular communication link 140, wireless frequency (WiFi) link 160, such as a link through an 802.11(a)-(g) compliant modem. In one embodiment, headset 110 may include links to communicate directly with the cellular network and/or the wireless network. In one embodiment, the headset 110 and mobile device 130 may share processing, to maximize battery life and provide the most seamless experience possible to the user.

Figure 2:
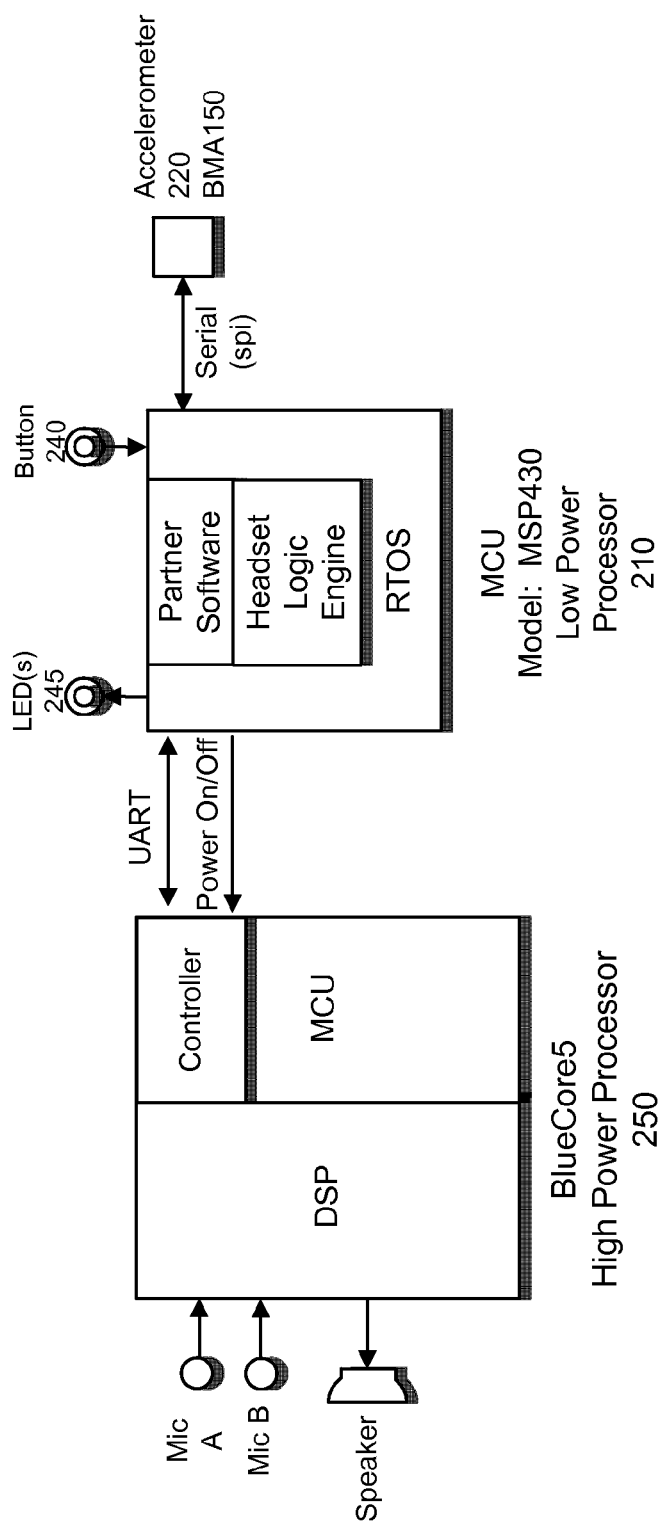
FIG. 2 is an illustration of one embodiment of a dual processor implementation of the device.

FIG. 2 is an illustration of one embodiment of a dual processor implementation of the headset. Low power processor 210 has as its inputs the buttons, the accelerometer, and in one embodiment a speech sensor, and other sensors included in the device. In one embodiment, some sensors which utilize extensive processing may be coupled to, or part of, the high power processor 250. In one embodiment, low power processor 210 may be a Texas Instruments® MSP430 microcontroller which is an ultra-low-power 16-bit RISC mixed-signal processor. The low power processor (LPP) also can turn on and off a high power processor (HPP) 250.

The high power processor HPP in one embodiment may be a CSR® BlueCore™ 5 integrated circuit which provides a programmable single-chip Bluetooth solution with on-chip DSP, stereo CODEC, and Flash memory. In another embodiment, the high power processor HPP may be a different type of processor, providing different functionality.

In one embodiment, the LPP 210 receives data from various sensors, which may include accelerometer 220 and other sensors (not shown). In one embodiment, accelerometer 220 is the BOSCH Sensortec® BMA150. The LPP 210 also sends and receives signals from and to user input device (button 240) and user output device (LED 245). These are merely exemplary user interfaces, of course, alternative interfaces may be utilized. For example, instead of or in addition to a button, the device may have a dial, a set of buttons, capacitance touch sensitive pads, a touch screen, or another type of user interface. Instead of or in addition to light emitting diodes (LEDs) 245, the device may have a screen, or any other visual data display mechanism. In one embodiment, HPP 250 maintains a Bluetooth connection, when it is awake, and receives any call signals from a telephone that is coupled to the headset 200.

The LPP 210 determines, using headset logic engine, whether the HPP 250 should be woken up. If so, the LPP 210 sends a Power On signal to the HPP 250. Similarly, when the device is quiescent, and the HPP 250 is not needed, the LPP 210 sends a Power Off signal, in one embodiment. In one embodiment, the HPP may automatically go to sleep if no use has been detected in a preset period of time, e.g. 5 seconds. In one embodiment, the HPP maintains a Bluetooth connection with the handset, if available.

Figure 3:
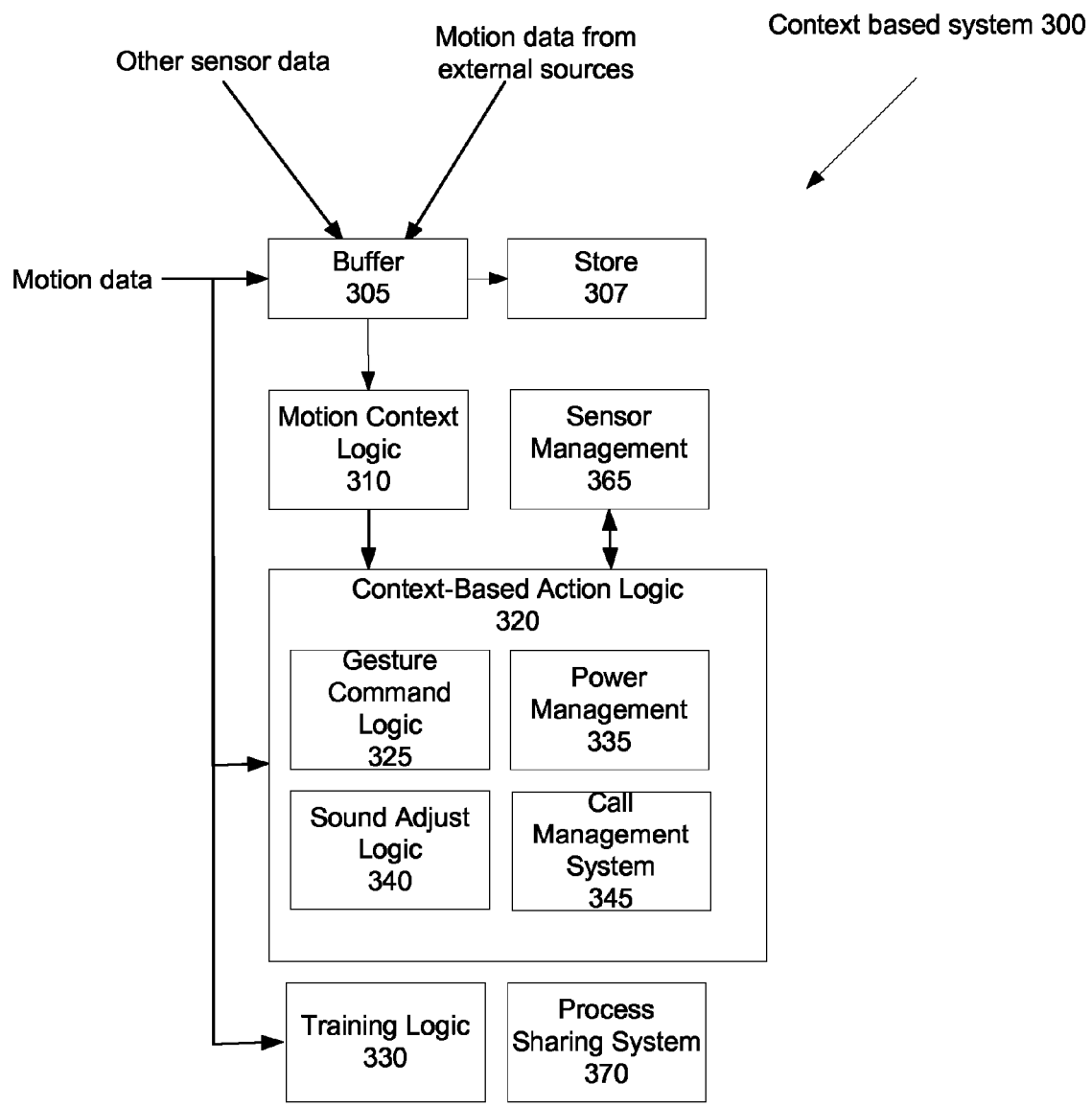
FIG. 3 is a block diagram of one embodiment of the context-based system.

FIG. 3 is a block diagram of one embodiment of the context-based system 300. The context based system 300, in one embodiment, is implemented on low power processor (LPP). In one embodiment, the context based system 300 is implemented across an LPP and a high power processor (HPP). The processes are split based on the specific processing requirements. However, in one embodiment, in a headset the high power processor is only used to handle maintaining a Bluetooth connection, and phone calls which require voice processing.

The motion context logic 310 receives sensor data. In one embodiment, the sensor data is motion data. In one embodiment, other sensor data may also be received. In one embodiment, other sensor data may include data such as barometer data, GPS data, temperature data, or any other data which may be used by the headset. In one embodiment, the data is collected by buffer 305. In one embodiment, some of the sensor data may be unrelated to the motion logic context, and may be simply collected by the context based system. In that case, in one embodiment, the data may simply be stored, in store 307. In one embodiment, store 307 may be Flash memory, or similar non-volatile storage. Store 307, in one embodiment, may also store processed data from sensors.

Motion context logic 310 uses the sensor data to determine the user's motion context. The motion context of the user may include determining whether the user is wearing the headset, whether the user is sitting, standing, laying down, moving in various ways. In one embodiment, the location context of the user may be part of the motion context. That is, in one embodiment the motion context of "walking on the street" may be different from the motion context of "walking around a track."

Context based action logic 320 receives the motion context information from motion context logic 310. Context based action logic 320 in one embodiment is implemented in the logic engine of the low power processor 210.

Gesture command logic 325 identifies motion commands. In one embodiment, commands may be defined by gestures, e.g. the user tapping the headset once, twice, three times, or in a certain pattern. For example, two rapid taps followed by a slower tap. Commands may also be defined by shakes, or other recognizable movements. In one embodiment, the commands available via a gesture command logic interface replace the commands entered via button pushes in the prior art. Since it is significantly easier to tap the side of a headset while wearing it—instead of attempting to successfully push a small button that one cannot see—this improves the user experience. Also it allows for a waterproof, or water resistant and sweat-proof button-free device. Gesture commands, in one embodiment, may be defined out of the box. In one embodiment, the user may further add, edit, and delete gesture commands to configure the device to suit their preferences. In one embodiment, gesture commands depend on the motion context. For example, a double tap when the user is running may initiate a run/training sequence. The same double tap when there is an incoming call may pick up the call.

In one embodiment, a user may define custom gesture commands using training logic 330. In one embodiment, the user interface may permit the use of verbal instructions, in programming the device. Verbal instructions may also be used in conjunction with, or to replace gesture commands. The gesture command logic 325 passes identified gesture commands to power management 335. Power management 335 determines whether to turn on-off the high power processor (not shown).

For certain commands, the high power processor is used to execute related actions. In that case, power management 335 ensures that the high power processor is active. Process sharing system 370 passes data and requests to the high power processor, and receives returned processed data, when appropriate.

Context based action logic 320 may further include sound adjust logic 340. Sound adjust logic 340 adjusts the sound input and output parameters, when appropriate. The sound output may be a receiving telephone connection, music played on the device, beeps, feedback noises, or any other sounds produced by the device. Depending on the user's context, the sounds may be too loud or two soft—the user may need a louder ring for example when he or she is jogging than in an office, the speaker volume may need to be louder when the user is driving in the car, the microphone may need to pick up softer tones and reduce echo in a quiet office. The system adjusts the sounds based on the determined motion context. In one embodiment, the method disclosed in co-pending application Ser. No. 12/469,633, entitled A "Method And Apparatus For Adjusting Headset/Handset Audio For A User Environment" filed May 20, 2009, which is herein incorporated by reference, may be utilized in connection with sound adjust logic 340.

Call management system 345 detects when a call is received. In one embodiment, the handset receives the call, and transmits a "ring" message to the headphone. If the high power processor is asleep, power management 335 handles it, and ensures that the call is transmitted. The gesture command logic 325 receives the command to pick up the call, if given by the user.

In one embodiment, sensor management 365 manages the power consumption of various sensors. In one embodiment, sensors are turned off when the headset is not in use, to increase battery life. For example, when the headset is not moving, it is not necessary to obtain GPS data more than once. Similarly, when the motion data indicates that the headset has not moved, or has moved minimally, barometer data and temperature data is unlikely to have changed. Therefore, those sensors can be turned off.

In one embodiment, one of the functions provided by the system is to turn the headset functionality to a minimum when the headset is not being worn. For example, users will often take off their Bluetooth headset, not turn it off, and leave it on the desk for most of the day. During this time, the high power power processor may be completely off, along with almost all sensors, while the low power processor is on stand-by and periodically monitors the motion sensor. In one embodiment, the LPP goes to sleep, and periodically wakes up just enough to sample the accelerometer and analyze the accelerometer data. In one embodiment, the monitoring period is every second. In another embodiment, it may be more or less frequent. In one embodiment, the monitoring period gradually increases, from when lack of motion is initially detected, to a maximum delay. In one embodiment, the maximum delay may be 1 second.

If the data indicates no motion, the LPP goes back to sleep. If the sample indicates that there is motion, the LPP wakes up, continues monitoring the accelerometer. In one embodiment, the LPP further determines whether the HPP should be woken up too. In one embodiment, the LPP automatically wakes up the HPP when it detects that the user has placed the headset in the "wearing" position, e.g. in the ear/head/etc. In one embodiment, the physical configuration of the headset is such that the position in which it is worn can be distinguished from any resting position. In one embodiment, the motion characteristics of placing the headset in the worn location are detected. This is because the user may be picking up the phone in order to take a call. The HPP establishes a Bluetooth connection to the phone, and determines whether there is a call in progress. If not, the HPP, in one embodiment, goes back to sleep.

By waking up the HPP when the headset is placed on the ear, the user perceives no delay in the ability to pick up the call on the headset. In another embodiment, the LPP waits until a gesture command is received before activating the HPP. In one embodiment, the user may set, via options, which happens.

When the user picks up the headset to pick up the phone, the low power sensor is powered up when it detects motion via the accelerometer sensor. Then, in one embodiment, the HPP is automatically woken, to determine whether there is a phone call/ring in progress. In another embodiment, the LPP monitors for the "pick-up phone command" and wakes up the HPP when that command is detected. The LPP, in one embodiment wakes up any other relevant sensors. In this way, the battery life of a headset can be significantly extended.

Figure 4:
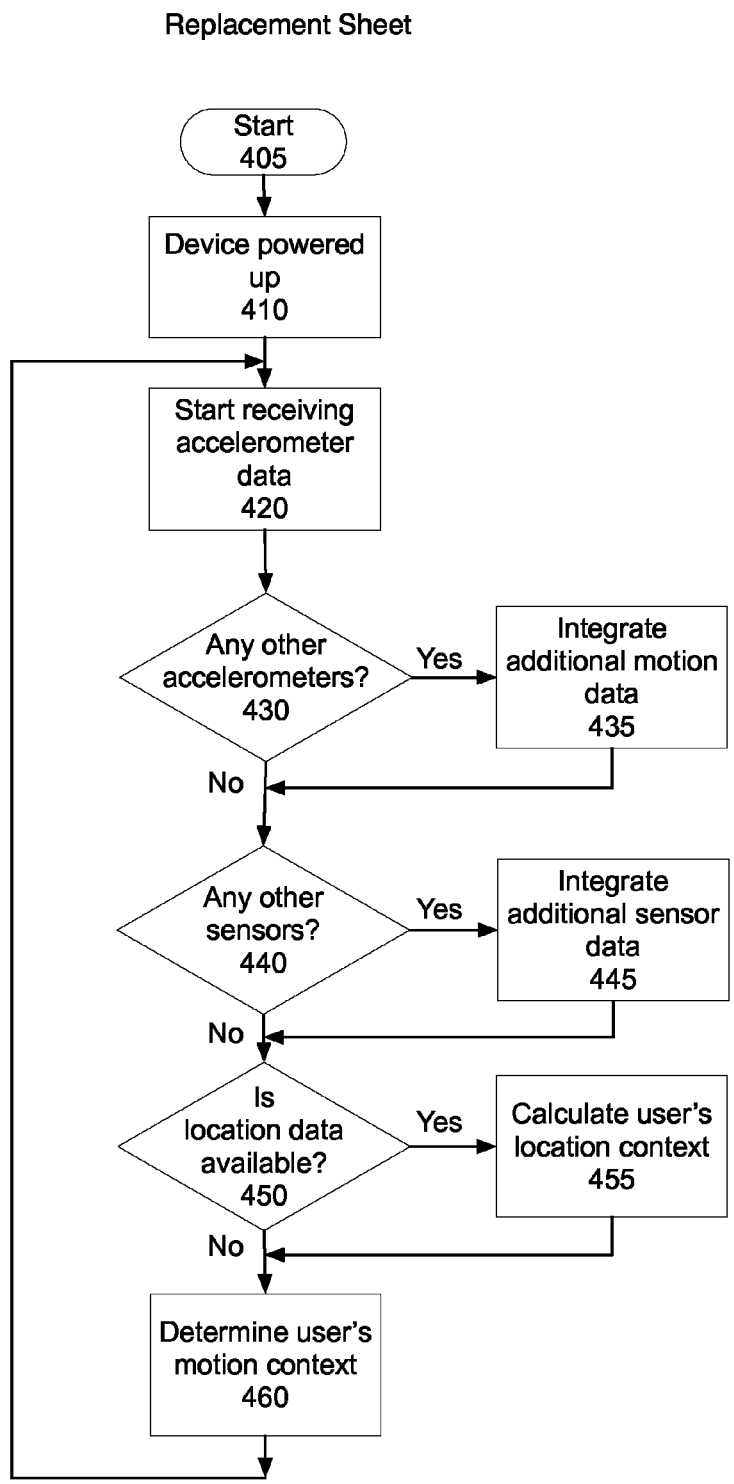
FIG. 4 is a flowchart of one embodiment of determining motion context.

FIG. 4 is a flowchart of one embodiment of determining motion context. The process starts at block 405. At block 410, the headset is powered up. In one embodiment, the process is initiated when the headset is powered. In another embodiment, the process is initiated when the headset is paired with a phone and/or powered up.

At block 420, the system starts receiving accelerometer data. The accelerometer, in one embodiment, is located in the headset. In one embodiment the accelerometer data is buffered. At block 430, the process determines whether there are any other accelerometers which may be providing data to be processed. In one embodiment, there may be more than one accelerometer in the headset. In one embodiment, there may be a separate accelerometer in the handset, or in another external sensor location. In one embodiment, data from these additional accelerometers is received, and integrated 435 to get a better idea of the current motion data of the user.

At block 440, the process determines whether there are any other sensors. In one embodiment, the headset or paired handset may include additional sensors such as a barometric sensor, a thermometer, a proximity sensor, a capacitance (touch) sensor, and/or other sensors that may assist in determining the user's motion state. If there are additional sensors, the data from the additional sensors is integrated into the motion state data at block 445.

At block 450, the process determines whether location data is available. If so, at block 455 the user's location context is calculated. At block 460, the user's motion context is determined based on all available data. In one embodiment, the user's motion context includes the user's position (e.g. walking, running, standing, sitting, laying down), as well as the user's proximate location (e.g. at the office, on the street, in a car, etc.).

Thus, the final "motion context" may include location context. This enables the system to differentiate between "the user is walking down a busy street" and "the user is walking in a hallway in his office."

Figure 5:
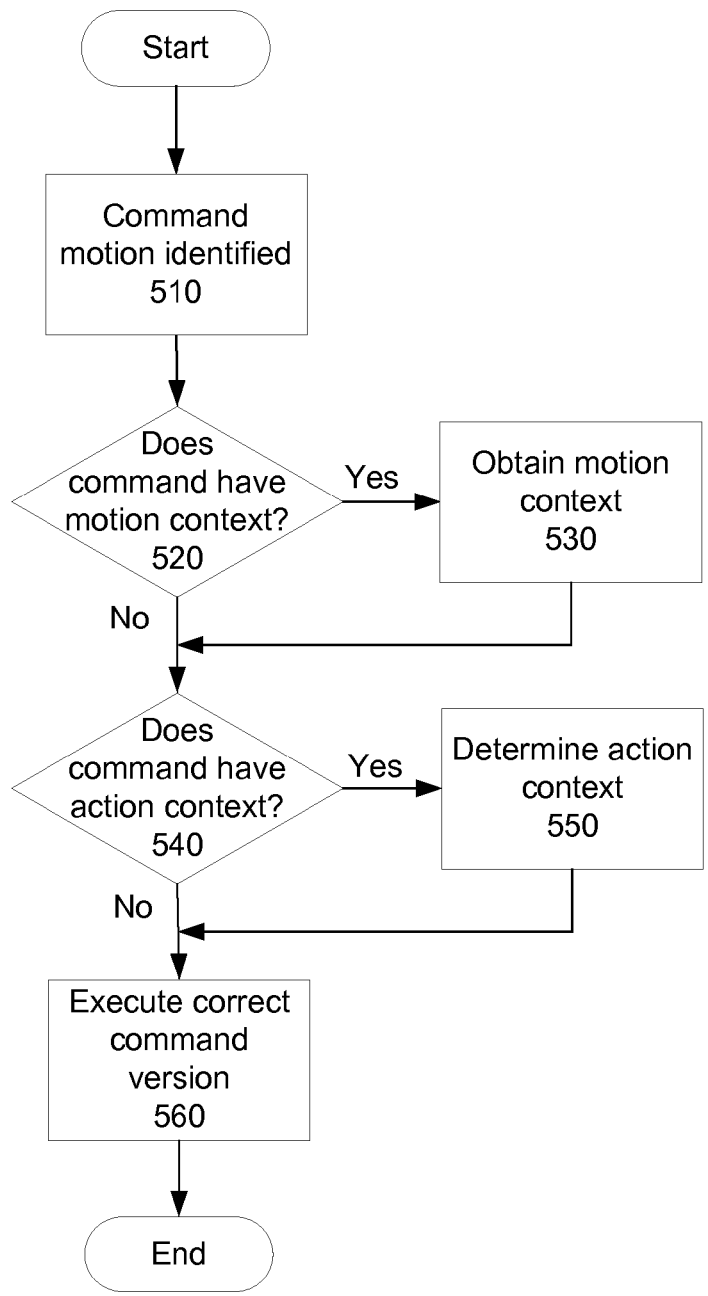
FIG. 5 is a flowchart of one embodiment of utilizing motion context based commands.

FIG. 5 is a flowchart of one embodiment of utilizing motion context based commands. The process starts at block 505. At block 510, a command is identified. The command may have been communicated via motion (e.g. tapping on the headset, shaking the headset up and down, etc.). Alternatively, the command may be indicated through the push of a button, or by verbally giving a command. The process continues to block 520.

At block 520, the process determines whether the command has motion context. If so, at block 530, the process obtains the motion context.

At block 540, the process determines whether the command has an action context. Certain commands mean different things based on other actions within the headset. For example, the same tap may indicate "pick up the phone" if the phone is ringing, and "hang up the phone" if a call has just been terminated. Thus, if appropriate the action context is determined, at block 550.

At block 560, the correct version actions associated with the received command is executed. The process then ends.

Figure 6:
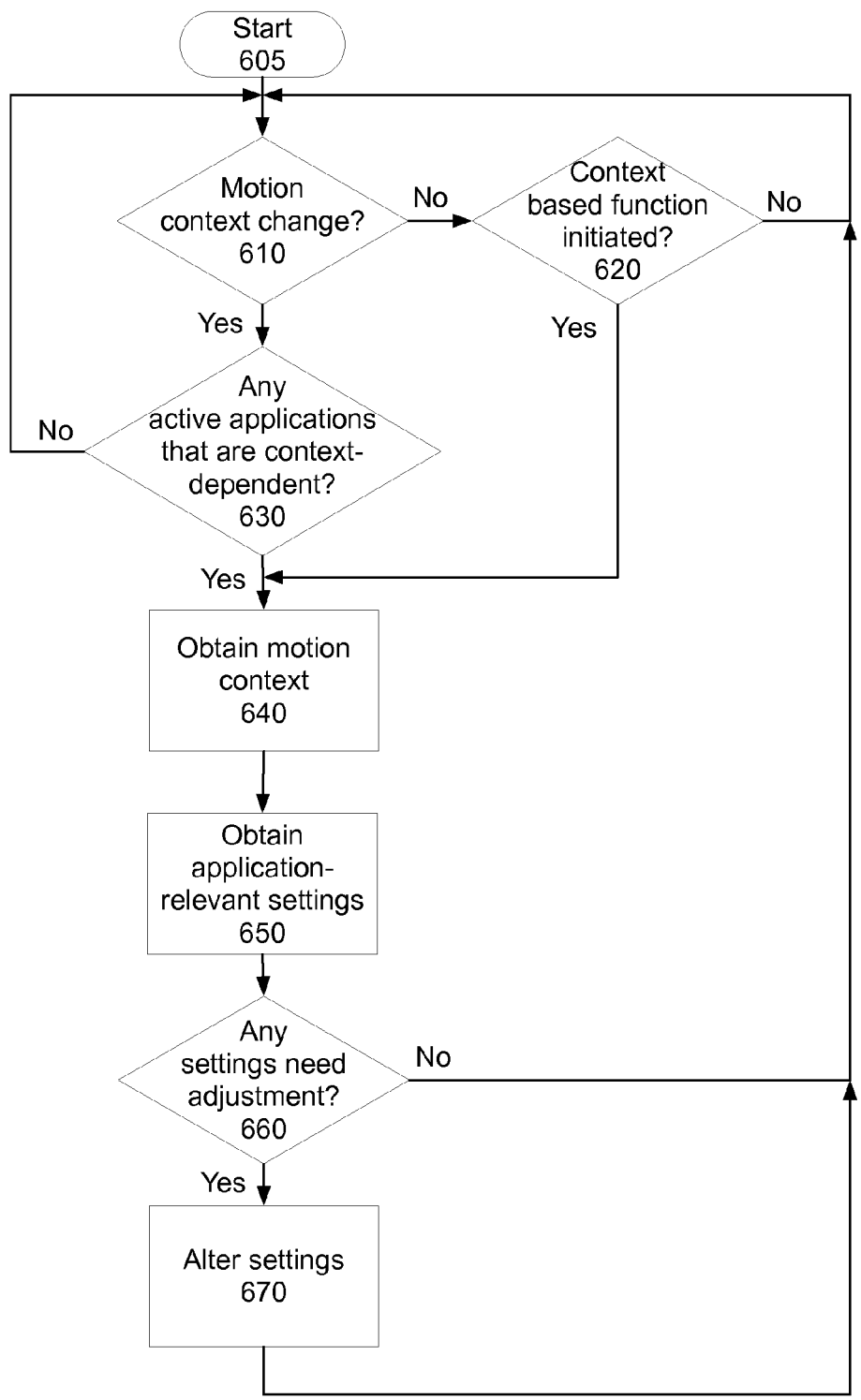
FIG. 6 is a flowchart of one embodiment of adjusting settings based on motion context.

FIG. 6 is a flowchart of one embodiment of adjusting settings based on motion context. The process starts at block 605. In one embodiment, this process is active whenever the headset is active.

At block 610, the process determines whether there has been a motion context change. If so, at block 630, the process determines whether any active applications are context dependent. If there are no context-dependent applications, the process returns to block 610 to continue monitoring. When there is an active application which relies on context, the process continues to block 640.

If there has been no context change, the process continues to block 620. At block 620, the process determines whether there has been a context-based function initiated. If not, the process returns to block 610, to continue monitoring for motion context changes. If a context based function has been initiated, the process continues directly to block 640.

At block 640, the new motion context is obtained. Note that the motion context describes the user's/device's current state.

At block 650, the application-relevant settings are obtained. The application relevant settings indicate which features are used by the application, and suggested changes to those settings based on the current motion context. For example, if the application in question is a music player, the volume, bass level, treble level may be the settings which are indicated.

At block 660, the process determines whether the change in context indicates that one or more of those settings need adjusting. If not, the process returns to block 610, to continue monitoring. For example, when a user moves from sitting to standing in the same location, it is likely that no adjustment to the volume of music playing is needed. However, if the user moves from walking to jogging, louder sound is likely needed to be heard. Similarly, in one embodiment, command recognition is tightened or loosened based on the user's motion state. For example, when a user is jogging, a lot of motions appear to be like a gesture command. Thus, a more narrow definition of the gesture command may be used to ensure that what is indicated is the gesture command, rather than mere jostling motions from jogging. For example, in one embodiment, the jogging-related motion is subtracted from the motion data to determine whether a command was received.

If adjustment is needed, at block 670 the appropriate settings are altered. The process then returns to block 610. In this way, the settings are automatically adjusted based on user and application context, as the user moves through his or her day. This means that the user need not fiddle with the headset when he or she gets into a car, or walks into a loud restaurant. This type of automatic adjustment is very convenient.

Figure 7:
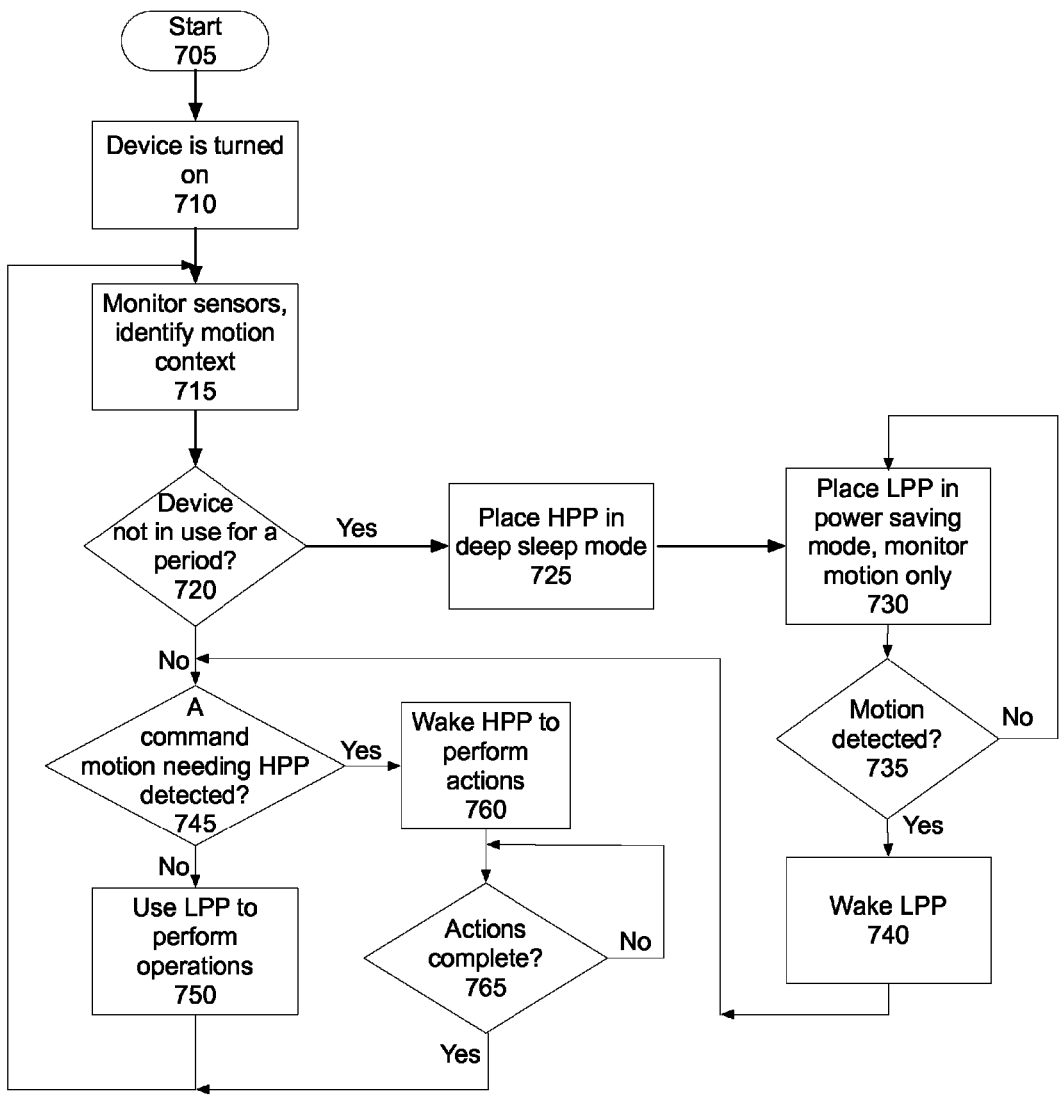
FIG. 7 is a flowchart of one embodiment of how power management is handled.

FIG. 7 is a flowchart of one embodiment of how power management is handled. The process starts at block 705. At block 710, the headset is turned on.

At block 715, sensor data is monitored and integrated to get a user motion context. As noted above, this reflects the user standing, sitting, walking, jogging, etc. It may further include motion location context, e.g. "standing in the office" or "walking into a loud restaurant" or "driving/riding in a car."

At block 720, the process determines whether the headset is not in use. In one embodiment, this may be indicated when the headset has been immobile for a preset period. In general, whenever a human is wearing an object, that human makes small motions. Even someone holding "perfect still" makes micro motions which would be detectable by an accelerometer or other motion sensing device. In one embodiment, the industrial design of the headset ensures that it is worn in an orientation unlikely to be replicated when headset is just sitting on a surface, and the orientation is used to determine whether the headset is not in use. Therefore, if a device is not in use for a period of time, it indicates that the device has been placed somewhere, and is no longer being worn. If that is the case, the process continues to block 725. At block 725, the high power processor is placed in deep sleep mode.

At block 730, the low power processor is placed in a power saving mode as well. In power saving mode, the motion sensor is monitored, to detect if the user picks up the headset. But, in one embodiment, no other sensors are monitored. In one embodiment, all other sensors which can be controlled by the headset are also placed in low power consumption mode, or turned off. Clearly when the headset is not moving, continuously monitoring the GPS signal is not useful. In one embodiment, the sensors remain on, but the sampling rate is lowered significantly. In one embodiment, the low power processor may monitor something other than motion data, e.g. gyroscope data, weight data, etc.

Once the devices are in power save mode, the process monitors to see if motion is detected, at block 735. As noted above, this may be done via an accelerometer within the device itself, or coupled to the device. In one embodiment, the monitoring frequency decreases over time. In one embodiment, the monitoring frequency may decrease gradually from the standard accelerometer sampling rate to a stand-by rate.

If motion is detected, at block 740 the low power processor is used to detect the motion context. The motion context generally would indicate why the headset had been moved, e.g. to pick up a call on the headset, etc. The process then continues to block 745.

At block 745, the process determines whether any of the identified applications, states, or received commands use additional processing power to be provided by the high power processor. In one embodiment, if the headset is picked up and placed in the configuration to be worn, the system determines whether there is an incoming phone call. In one embodiment, this uses the Bluetooth connection, and therefore high power processor is woken up. If so, at block 760 the high power processor is woken up. The process monitors until the actions are completed, at block 765. When the process determines that the actions are completed, the process returns to block 715 to continue monitoring motions.

If at block 745, the high power processor was found to be unnecessary, at block 750 the LPP is used to perform the relevant operations. The process then returns to block 715 to continue monitoring.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A motion aware mobile device comprising:
    a processor;
    a motion context logic implemented in the processor to determine a motion context of the device, the motion context automatically identifying absent user input a geographic location of the device, a type of user activity, a user's environment, and a relative location of the device with respect to the user's body based in part on data from a motion sensor, the relative location indicating that the device is in an in-use location on the user's body based on the data from the motion sensor or a not-in-use location based on an orientation of the device, wherein the type of user activity identified in the motion context includes distinguishing types of user activities selected from among: standing, sitting, walking, jogging;
    a context-based action logic to automatically manage the device based on the motion context via a context-based action logic engine; and
    a gesture command logic to identify a motion command and to automatically determine an appropriate action based on the context-based action logic engine, the identification automatically tightened or loosened to change a definition of a gesture command based on the motion context of the device.

2. The device of claim 1, further comprising:
    a gesture command logic automatically to identify a motion command and to determine an appropriate action, the appropriate action defined by the motion context and application context of the device, the identification tightened or loosened based on the motion context of the device.

3. The device of claim 1, wherein the context-based action logic engine further comprises:
    a sound adjust logic to automatically adjust an input and/or an output sound level based on the motion context of the device.

4. The device of claim 1, further comprising:
    a power management system to place portions of the device into a suspended state, when the device is not being actively used, the state of not being actively used determined based on the motion context.

5. The device of claim 4, wherein the portion of the device placed into the suspended state comprises a high-powered processor, while maintaining a low-powered processor to manage the device.

6. The device of claim 4, further comprising, the power management system placing at least one sensor coupled to the device into a power saving mode.

7. The device of claim 4, wherein when the device is immobile for a period, the suspended state includes having only the motion data monitored to detect removal from inactive status.

8. A motion-state aware device comprising:
a low power processor (LPP) to monitor a sensor, the LPP including:
a motion context logic to determine a motion context of the device, the motion context identifying a type of user activity, a motion location context of the device automatically determined from a location of the device and the type of user activity at the location, a user's environment, and a relative location of the device with respect to the user's body;
a context-based action logic to automatically manage the device based in the motion context via a context-based action logic engine;
a gesture command logic to automatically identify a motion command and to automatically determine an appropriate action based on the context-based action logic, identification tightened or loosened to change a definition of a gesture command based on the motion context of the device; and,
a power management system to wake up portions of the motion-state aware device when the motion context indicates a need for the portions.

9. The device of claim 8, further comprising:
a high power processor to provide processing capability, the high power processor turned on and off by the LPP based on the motion context.

10. The device of claim 8, wherein the motion command is configured by a user of the device.

11. The device of claim 10, further comprising:
a call management system to detect a received call; and
the power management system to wake up portions of the device to enable the device to ring and the received call to be picked up.

12. The device of claim 9, wherein the low power processor automatically wakes up the high power processor when the motion context of the device indicates the device is in a worn location.

13. The device of claim 8, further comprising:
a gesture command logic to automatically identify a motion command and to determine an appropriate action, the appropriate action defined by the motion context and application context of the device.

14. The device of claim 8, further comprising:
a sound adjust logic to adjust an input and/or an output sound level based on the motion context of the device.

15. The device of claim 9, further comprising:
a power management system to place the high power processor into a suspended state, when the device is not being actively used, the state of not being actively used determined based on the motion context.

16. The device of claim 15, further comprising, the power management system placing at least one sensor into a power saving mode.

17. The device of claim 15, wherein when the device is immobile for a period, the suspended state includes having only the motion data monitored to detect removal from inactive status.

18. The device of claim 8, further comprising the LPP including:
a call management system to detect a received call; and
a power management system to wake up portions of the device to enable the device to ring and the received call to be picked up.

19. A method for adjusting settings of a motion aware device, the method comprising:
determining a motion context of a motion aware device based on a type of user activity, a motion location context of the user automatically determined absent user input based on a user's location and the type of user activity at the location, a user's environment, and a relative location of the device with respect to the user's body, the relative location indicating that the device is in an in-use location on the user's body based on motion characteristics of the device or a not-in-use location based on an orientation of the device; and
automatically managing the motion aware device based on the motion context by automatically tightening or loosening gesture recognition based on the motion context of the device.

20. The method of claim 19, further comprising:
determining that the device is not in use based on the motion context; and
placing a portion of the motion aware device in a low power mode.

21. The method claim 20, wherein the portion is one or more of: a low power processor, a high power process, and a sensor.

* * * * *